United States Patent [19]
Haner et al.

[11] Patent Number: 5,473,460
[45] Date of Patent: Dec. 5, 1995

[54] ADAPTIVE EQUALIZER FOR ANALOG OPTICAL SIGNAL TRANSMISSION

[75] Inventors: Mark Haner, Westfield; Robert K. Montgomery, Neshanic Station, both of N.J.

[73] Assignee: AT&T Corp., Murray Hill, N.J.

[21] Appl. No.: 280,639

[22] Filed: Jul. 25, 1994

[51] Int. Cl.$^6$ ..................................................... H04B 10/04
[52] U.S. Cl. .......................... 359/188; 359/161; 359/180; 372/32
[58] Field of Search ..................... 359/180, 177, 359/176, 179, 187, 188, 161; 455/114; 330/149; 372/29, 31, 32; 375/296

[56] References Cited

U.S. PATENT DOCUMENTS

| | | | |
|---|---|---|---|
| 4,811,422 | 3/1989 | Kahn | 455/114 |
| 5,119,392 | 6/1992 | Childs | 372/31 |
| 5,161,044 | 11/1992 | Nazarathy | 359/187 |
| 5,321,543 | 6/1994 | Huber | 359/187 |
| 5,321,710 | 6/1994 | Cornish | 372/31 |
| 5,361,156 | 11/1994 | Pidgeon | 359/161 |

Primary Examiner—Leslie Pascal

[57] ABSTRACT

An adaptive equalizer (also called a laser interface) for generating an electrical modulating signal for use by a laser to modulate an optical data signal. The laser has a non-linear modulation response pattern such that the optical data signal comprises a primary data signal and a plurality of harmonic distortion products. The adaptive equalizer operates by generating a correction electrical signal having a frequency equal to a frequency of one of the harmonic distortion products (this harmonic distortion product is nulled by operation of the adaptive equalizer). The adaptive equalizer detects the phase and amplitude of the harmonic distortion product. Then, the adaptive equalizer phase shifts the correction electrical signal in accordance with the detected phase such that the correction electrical signal and the harmonic distortion product are conjugately matched. The adaptive equalizer amplifies the phase shifted correction electrical signal in accordance with the detected amplitude such that the phase shifted correction electrical signal and the harmonic distortion product are equal in amplitude. Then, the amplified and phase shifted correction electrical signal is combined with an electrical data signal to form the electrical modulating signal.

12 Claims, 7 Drawing Sheets

ADAPTIVE EQUALIZER FOR ANALOG OPTICAL SIGNAL TRANSMISSION

CROSS-REFERENCE TO OTHER APPLICATIONS

The following application has the same effective filing date as the present application, and is assigned to the assignee of the present application:

U.S. patent application entitled "A Modem Having a Phase Corrector and a Voltage Controlled Oscillator Implemented Using A Multi-Stage Ring Oscillator", Ser. No. 280,638, filed Jul. 25, 1994, incorporated herein by reference.

BACKGROUND OF THE INVENTION

1. Field of the Invention

The present invention relates generally to converting electrical signals to optical signals, and more particularly to adaptively equalizing (i.e., nulling) any intermodulation distortion effects resulting from such conversion of electrical signals to optical signals.

2. Related Art

Data transmission over an optical communication medium, such as a fiber optic cable, is typically achieved by first converting a data signal to a modulating signal. Both the data signal and the modulating signal are analog RF (radio frequency) modulated electrical signals. The modulating signal is applied to a laser to produce a modulated optical signal such that the optical signal is an optical representation of the electrical data signal. In other words, the optical signal is modulated using the modulating signal such that the optical signal is embedded with the information contained in the data signal. This optical signal is then transmitted to appropriate destinations via the optical communication medium.

However, the modulation response of a laser when an analog or digital RF modulating signal is applied is not linear. Such nonlinear modulation response characteristics result in the generation of intermodulation distortion on the transmitted signal. The intermodulation distortion degrades the quality and fidelity of the optical signal to be transmitted and also limits the span of optical fiber over which the signal may be transmitted.

A prior solution to this problem involves the use of a tuned hybrid circuit to compensate for a laser's non-linearity modulation response pattern. This tuned hybrid circuit generates a first signal and a second signal, where the first signal has a first frequency, a first phase, and a first amplitude, and the second signal has a second frequency, a second phase, and a second amplitude.

A human operator analyzes the intermodulation distortion products and then implements the tuned hybrid circuit using appropriate passive components (such as capacitors and resistors) so as to set the values of the first and second frequencies, phases, and amplitudes. Ideally, the first and second frequencies, phases, and amplitudes are set by the human operator so that the first and second signals are equal in amplitude but opposite in phase to the intermodulation distortion products. The first and second signals are used to produce the electrical modulating signal such that the optical signal produced by the laser in accordance with the electrical modulating signal does not contain any intermodulation distortion products.

This prior solution is flawed since it is subject to human error. The intermodulation distortion products are canceled only if the human operator accurately determines and sets the first and second frequencies, phases, and amplitudes.

This prior solution is also flawed because it does not automatically compensate for changes in the phase and/or amplitude of the intermodulation distortion products. As will be appreciated by persons skilled in the art, the modulation response pattern of a laser drifts over time. Such drifts result in phase and/or amplitude changes in the intermodulation distortion products generated by the laser. Since it must be manually tuned, the conventional tuned hybrid circuit of the prior solution is not capable of automatically adjusting to changes in the phase and/or amplitude of the intermodulation distortion products.

Thus, what is required is an adaptive equalizer which, without any human intervention, automatically nulls intermodulation distortion products generated as a result of a laser's non-linear modulation response pattern, and which automatically compensates for phase and/or amplitude changes in the intermodulation distortion products caused by drifting of the laser's modulation response pattern.

SUMMARY OF THE INVENTION

The present invention is directed to an adaptive equalizer (also called a laser interface) for generating an electrical modulating signal for use by a laser to modulate an optical data signal. The laser has a non-linear modulation response pattern such that the optical data signal comprises a primary data signal and a plurality of harmonic distortion products. The adaptive equalizer operates by generating a correction electrical signal having a frequency equal to a frequency of one of the harmonic distortion products (this harmonic distortion product is nulled by operation of the adaptive equalizer). The adaptive equalizer detects the phase and amplitude of the harmonic distortion product. Then, the adaptive equalizer phase shifts the correction electrical signal in accordance with the detected phase such that the correction electrical signal and the harmonic distortion product are conjugately matched. The adaptive equalizer amplifies the phase shifted correction electrical signal in accordance with the detected amplitude such that the phase shifted correction electrical signal and the harmonic distortion product are equal in amplitude. Then, the amplified and phase shifted correction electrical signal is combined with an electrical data signal to form the electrical modulating signal.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

1. Overview of the Present Invention

Figure 1:
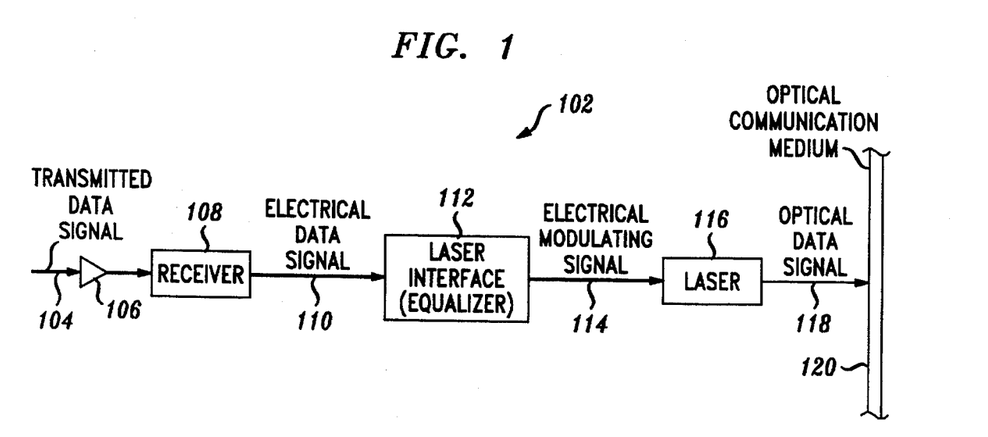
FIG. 1 is a block diagram of a communication system according to a preferred embodiment of the present invention.

FIG. 1 is a block diagram of a communication system 102 (only those portions of the communication system 102 relevant to the present invention are shown). The communication system 102 includes an antenna 106 which receives a transmitted data signal 104 that was transmitted (i.e., broadcasted) over the air by a mobile communication terminal (such as a cellular telephone, not shown). Preferably, the transmitted data signal 104 represents digital data or analog that is being carried by an RF (radio frequency) carrier.

A receiver 108 processes the transmitted data signal 104 in a well known manner to produce a preferably RF electrical data signal 110. The electrical data signal 110 is an electrical representation of the transmitted data signal 104. In other words, the electrical data signal 110 contains the data embedded in the transmitted data signal 104.

A laser interface 112 (also called an adaptive equalizer) converts the electrical data signal to a preferably RF electrical modulating signal 114. This electrical modulating signal 114 is transferred to a well known laser 116. The laser 116 uses the electrical modulating signal 114 in a well known manner to modulate an optical data signal 118 such that the optical data signal 118 is an optical representation of the electrical data signal 110. In other words, the optical data signal 118 contains the information embedded in the electrical data signal 110. The optical data signal 118 is transmitted to appropriate destinations via an optical communication medium 120, such as a fiber optic cable.

The present invention is adapted for use in wireless communication applications. Hence, the receiver 108 is shown in FIG. 1 as being connected to the antenna 106. However, it should be understood that the present invention, particularly the laser interface 112, may also be used in non-wireless communication applications. For example, the laser interface 112 could be used when the data signal originates from a source or transmitter.

As will be appreciated by persons skilled in the art, the modulation response of the laser 116 is not linear. Consequently, the laser 116 may generate intermodulation distortion products when using the electrical modulating signal 114 to modulate the optical data signal 118. Such intermodulation distortion products are present in the optical data signal 118, and operate to compromise and distort the optical data signal 118.

According to the present invention, the laser interface 112 generates the electrical modulating signal 114 so as to compensate for any non-linear modulation response characteristics of the laser 116. In particular, the laser interface 112 identifies and quantifies any intermodulation distortion products contained in the optical data signal 118, and generates a plurality of signals which are herein called correction signals or terms 206, 208. These correction signals 206, 208 each has a frequency, amplitude, and phase necessary to cancel the intermodulation distortion products when combined with the electrical modulating signal. The laser interface 112 uses the correction signals 206, 208 to generate the electrical modulating signal 114, such that the laser 116 does not generate intermodulation distortion products when using the electrical modulating signal 114 to modulate the optical data signal 118.

According to the present invention, the laser interface 112 automatically performs such cancellation (nulling) of the intermodulation distortion products generated by the laser 116. No human intervention is necessary. In particular, it is not necessary for a human operator to manually determine and set the frequency, phase, and/or amplitude of the correction signals 206, 208. Instead, the correction signals 206, 208 are automatically generated.

Also, the laser interface 112 automatically compensates for any phase and/or amplitude changes in the intermodulation distortion products caused by drifting of the modulation response pattern of the laser 116. In particular, the laser interface 112 automatically adjusts the phase and/or amplitude of the correction signals 206, 208 to compensate for any changes in the phase and/or amplitude of the intermodulation distortion products generated by the laser 116.

The laser interface 112 of the present invention is described in detail in the following sections.

2. Laser Interface (Adaptive Equalizer)

Figure 2:
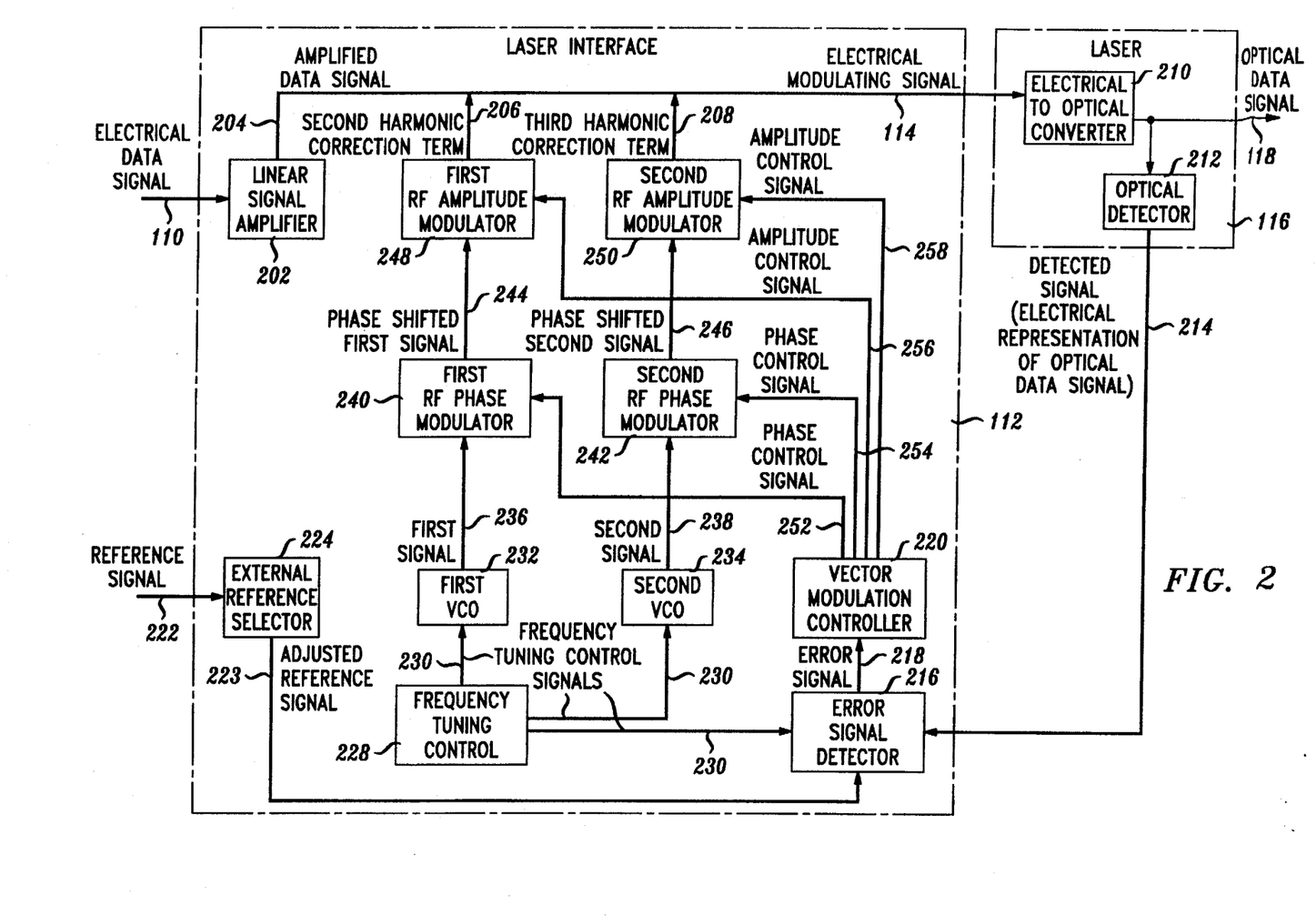
FIG. 2 is a block diagram of a laser interface and a laser according to a preferred embodiment of the present invention.

FIG. 2 is a block diagram of the laser interface 112 according to a preferred embodiment of the present invention. FIG. 2 also shows, in block diagram form, details of the well known laser 116 which are pertinent to the present invention.

In particular, the laser 116 includes an electrical-to-optical converter 210 which, in a well known manner, uses the electrical modulating signal 114 (generated by the laser interface 112) to modulate the optical data signal 118 such that the optical data signal 118 is an optical representation of the electrical data signal 110. The optical data signal 118 is transmitted to appropriate destinations via an optical communication medium 120 (FIG. 1). The optical data signal 118 is also provided to an optical detector 212.

The optical detector 212 operates in a well known manner to convert the optical data signal 118 to an electrical signal 214, called the "detected signal" in FIG. 2. The detected signal 214 is an electrical representation of the optical data signal 118 including any intermodulation distortion products present in the optical data signal 118. As such, any intermodulation distortion products contained in the optical data signal 118 are electrically represented in the detected signal 214. The structure and operation of the electrical-to-optical converter 210 and the optical detector will be apparent to persons skilled in the relevant art.

Before discussing the laser interface 112 in detail, it will be useful to consider the nature of the intermodulation distortion products generated by the laser 116. As will be appreciated by persons skilled in the relevant art, the optical data signal 118 generated by the laser 116 includes a primary signal and a number of harmonics. The primary signal represents the "pure" optical representation of the electrical data signal 110. For example, if the electrical data signal 110 is sin(wt), then the primary signal of the optical data signal 118 is also sin(wt).

The harmonics of the optical data signal 118 represent the intermodulation distortion effects. Such harmonics include a second order harmonic, a third order harmonic, a fourth order harmonic, etc. (These are called, simply, the second harmonic, the third harmonic, etc.). If the electrical data signal 110 is sin(wt), then the second harmonic is sin(2wt), the third harmonic is sin(3wt), etc., as described by the Fourier harmonic series.

Considering now the laser interface 112, the laser interface 112 includes a linear signal amplifier 202 which amplifies the electrical data signal 110 to produce an amplified data signal 204. Such amplification is necessary to compensate for any losses incurred from prior processing of the electrical data signal 110 by the antenna 106 and/or the receiver 108 (FIG. 1). The structure and operation of the linear signal amplifier 202 will be apparent to persons skilled in the relevant art.

The laser interface 112 also includes a number of components which operate to generate a second harmonic correction term 206 and a third harmonic correction term 208. The amplified data signal 204 is combined in a well known manner with the second harmonic correction term 206 and the third harmonic correction term 208 to produce the electrical modulating signal 114 (for example, power representative of the amplified data signal 204, the second harmonic correction term 206, and the third harmonic correction term 208 may be summed).

According to the present invention, the second harmonic correction term 206 has the same frequency and amplitude as the second harmonic of the optical data signal 118. However, the second harmonic correction term 206 and the second harmonic of the optical data signal 118 are conjugately matched with one another (conjugate matching of two sin waves is well known and well documented and states that the mathematical relationship between two conjugately matched sine waves is such that when they are added together they cancel, or null, each other). In the simplest case they would be of the same frequency and amplitude, but with conjugate (i.e., 180° out of phase) phase. As will appreciated by persons skilled in the relevant art, when two vectors of equal amplitude and opposite phase (i.e., 180 degree phase difference) are combined, a null vector is produced. Accordingly, the second harmonic correction term 206 operates to equalize the effects of the second harmonic of the optical data signal 118. In other words, the second harmonic correction term 206 operates to cancel (or null) the second harmonic of the optical data signal 118. More particularly, by using the second harmonic correction term 206 to produce the electrical modulating signal 114, the electrical modulating signal 114 is adjusted (relative to the immediately preceding version of the electrical modulating signal 114) so that the laser 116 does not produce the second harmonic when using the electrical modulating signal 114 to modulate the optical data signal 118.

Similarly, the third harmonic correction term 208 has the same frequency and amplitude as the third harmonic of the optical data signal 118, and is conjugately matched with the third harmonic of the optical data signal 118. Accordingly, the third harmonic correction term 208 operates to equalize the effects of the third harmonic of the optical data signal 118. In other words, the third harmonic correction term 208 operates to cancel (or null) the third harmonic of the optical data signal 118. More particularly, by using the third harmonic correction term 208 to produce the electrical modulating signal 114, the electrical modulating signal 114 is adjusted (relative to the immediately preceding version of the electrical modulating signal 114) so that the laser 116 does not produce the third harmonic when using the electrical modulating signal 114 to modulate the optical data signal 118.

According to a preferred embodiment of the present invention, the laser interface 112 cancels out only the second and third harmonics of the optical data signal 118. This is the case, since the second and third harmonics represent the intermodulation distortion products having the greatest impact on the optical data signal 118. In alternate embodiments of the invention, however, the laser interface 112 cancels out additional harmonics of the optical data signal 118. In such alternate embodiments, the laser interface 112 generates correction terms other than the second harmonic correction term 206 and the third harmonic correction term 208. Modification of the laser interface 112 to generate such additional correction terms will be apparent to persons skilled in the relevant art based on the discussion contained herein.

The components of the laser interface 112 which operate to generate the second harmonic correction term 206 and the third harmonic correction term 208 shall now be described with reference to FIG. 3, which is a flowchart 302 depicting the operation of the laser interface 112.

As noted above, the linear signal amplifier 202 in the laser interface 112 amplifies the electrical data signal 110 to produce the amplified data signal 204. This amplified data signal 204 is combined with the second harmonic correction term 206 and the third harmonic correction term 208 to produce the electrical modulating signal 114. These operations are represented in FIG. 3 as steps 306 and 308, respectively.

As represented by step 310, a first voltage controlled oscillator (VCO) 232 generates a signal 236 (called herein the first signal for reference purposes) having the same frequency as the second harmonic of the optical data signal 118. Similarly, a second VCO 234 generates a signal 238 (called herein the second signal for reference purposes) having the same frequency as the third harmonic of the optical data signal 118. The first and second VCOs 232, 234 generate the first and second signals 236, 238 at such frequencies in accordance with frequency tuning control signals 230 generated by a frequency tuning control 228. In alternate embodiments of the invention, the first and second signals 236, 238 could be produced by an auxiliary signal generator.

Preferably, the first VCO 232 operates such that the first signal 236 comprises two balanced signals of equal amplitude and having a phase difference of 90 degrees. As will be appreciated by persons skilled in the art, a balanced signal comprises two identical signals that have a phase difference of 180 degrees (they are the inverse of one another). Similarly, the second VCO 234 operates such that the second signal 238 comprises two balanced signals of equal amplitude and having a phase difference of 90 degrees. The first and second VCOs 232, 234 are described in U.S. patent application entitled "A Modem Having a Phase Corrector and a Voltage Controlled Oscillator Implemented Using A Multi-Stage Ring Oscillator", Ser. No. 280,639, filed Jul. 25, 1994, incorporated herein by reference.

Figure 3:
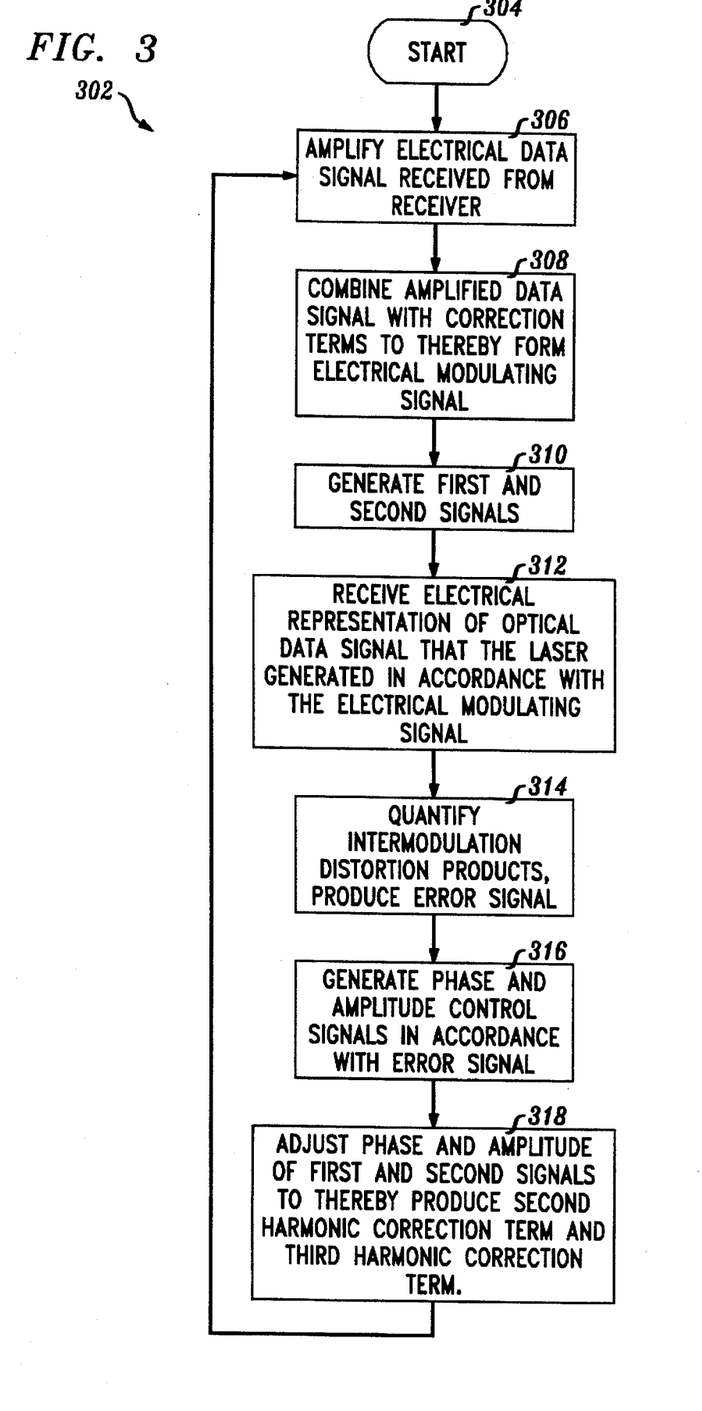
FIG. 3 is a flowchart depicting the preferred operation of the present invention.

As represented by step 312 of FIG. 3, an error signal detector 216 in the laser interface 112 receives the detected signal 214 that was generated by the optical detector 212 in the laser 116. As discussed above, the detected signal 214 is an electrical representation of the optical data signal 118. In alternate embodiments of the invention, the detector 218 can reside external to the laser 116.

The error signal detector 216 identifies and quantifies the intermodulation distortion products contained in the detected signal 214 (step 314). Specifically, the error signal detector 216 determines the phase and the amplitude of preferably the second and third harmonics contained in the optical data signal 118 (as electrically represented in the detected signal 214). Such phase information and amplitude information for the second and third harmonics are encapsulated in an error signal 218, which is provided to a vector modulation controller 220.

As represented by step 316, the vector modulation controller 220 uses the error signal 218 to generate phase control signals 252, 254 and amplitude control signals 256, 258. The phase control signal 252 indicates the degree to which the phase of the first signal 236 must be modified so that the first signal 236 is conjugately matched with the second harmonic of the optical data signal 118. The phase control signal 254 indicates the degree to which the phase of the second signal 238 must be modified so that the second signal 238 is conjugately matched with the third harmonic of the optical data signal 118. The amplitude control signal 256 indicates the degree to which the amplitude of the first signal 236 must be modified so that the first signal 236 has the same amplitude as the second harmonic of the optical data signal 118. The amplitude control signal 258 indicates the degree to which the amplitude of the second signal 238 must be modified so that the second signal 238 has the same amplitude as the third harmonic of the optical data signal 118.

As represented by step 318, the phase control signal 252 is provided to a first RF phase modulator 240. The first RF phase modulator 240 generates, in accordance with the phase control signal 252, a phase shifted first signal 244 from the first signal 236, wherein the phase shifted first signal 244 is conjugately matched to the appropriate distortion product (the second harmonic in this case) of the optical data signal 118.

The amplitude control signal 256 is provided to a first RF amplitude modulator 248. The first RF amplitude modulator 248 generates, in accordance with the amplitude control signal 256, a second harmonic correction term 206 from the phase shifted first signal 244, wherein the amplitude of the second harmonic correction term 206 is such as to null out the second harmonic of the optical data signal 118. Also, by operation of the first VCO 232, the frequency of the second harmonic correction term 206 is such as to null out the second harmonic of the optical data signal 118. By operation of the first RF phase modulator 240, the phase shifted first signal 244 is conjugately matched to the second harmonic of the optical data signal 118. Conjugate matching of the first signal 244 with the appropriate distortion product in the optical data signal 118 will cancel (or null) the distortion in the optical data signal 118.

Similarly, a second phase control signal 254 is provided to a second RF phase modulator 242. The second RF phase modulator 242 generates, in accordance with the phase control signal 254, a phase shifted second signal 246 from the second signal 238, wherein the phase shifted second signal 246 is conjugately matched to the third harmonic of the optical data signal 118.

The amplitude control signal 258 is provided to a second RF amplitude modulator 250. The second RF amplitude modulator 250 generates, in accordance with the amplitude control signal 258, a third harmonic correction term 208 from the phase shifted second signal 246, wherein the amplitude of the third harmonic correction term 208 is such as to null out the third harmonic of the optical data signal 118. Also, by operation of the second VCO 234, the frequency of the third harmonic correction term 208 is such as to null out the third harmonic of the optical data signal 118. By operation of the second RF phase modulator 242, the phase shifted second signal 246 is conjugately matched to the third harmonic of the optical data signal 118. Conjugate matching of the second signal 246 with the appropriate distortion product in the optical data signal 118 will cancel (or null) the distortion in the optical data signal 118.

The second harmonic correction term 206 and the third harmonic correction term 208 are combined with the amplified data signal 204 to produce the electrical modulating signal 114, as discussed above (step 308).

As will be appreciated by persons skilled in the relevant art based on the above discussion, the present invention automatically cancels (without any human intervention) any intermodulation distortion products generated by the laser 116 when using the electrical modulating signal 114 to modulate the optical data signal 118. Such automatic cancellation of intermodulation distortion products is achieved by producing the electrical modulating signal 114 using correction term signals (i.e., the second harmonic correction term 206 and the third harmonic correction term 208) which are conjugately matched and thus have an appropriate frequency, amplitude, and phase with respect to the intermodulation distortion products so as to exactly cancel the intermodulation distortion products, and by automatically and continuously generating such correction term signals 206, 208 based on a real-time analysis of the detected signal 214 (which is an electrical representation of the optical data signal 118). Also, since the correction term signals 206, 208 are continuously and automatically generated based on an analysis of the detected signal 214, the present invention automatically adjusts to changes in the frequency, amplitude and phase of the intermodulation distortion products (caused by drifting of the modulation response pattern of the laser 116).

3. Implementation Details

Components of the laser interface 112 are discussed in greater detail in the following sections.

3.1 Error Signal Detector

Figure 4A:
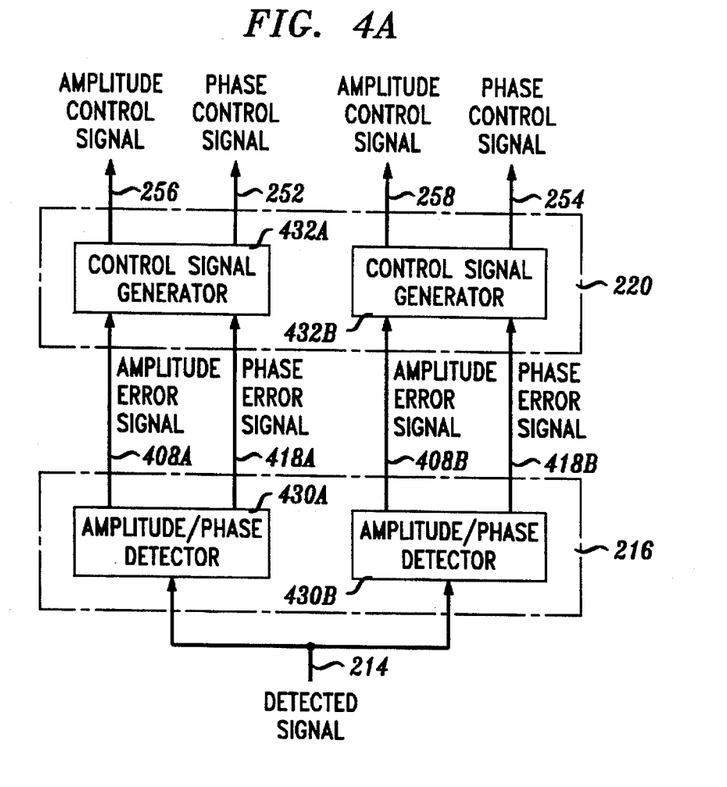
FIG. 4A is a block diagram of a error signal detector and a vector modulation controller according to a preferred embodiment of the present invention.

FIG. 4A is a block diagram of the error signal detector 216 and the vector modulation controller 220. The error signal detector 216 is considered in this section and the vector modulation controller 220 is considered in the next section.

The error signal detector 216 includes an amplitude/phase detector 430 for each harmonic of the optical data signal 118 that is being nulled. Thus, since preferably the second and the third harmonics are being nulled, the error signal detector 216 includes two amplitude/phase detectors 430A, 430B. Each 10 of the amplitude/phase detectors 430 receives the detected signal 214 (generated by the optical detector 212 in the laser 116, FIG. 2) and generates an amplitude error signal 408 and a phase error signal 418.

Figure 4B:
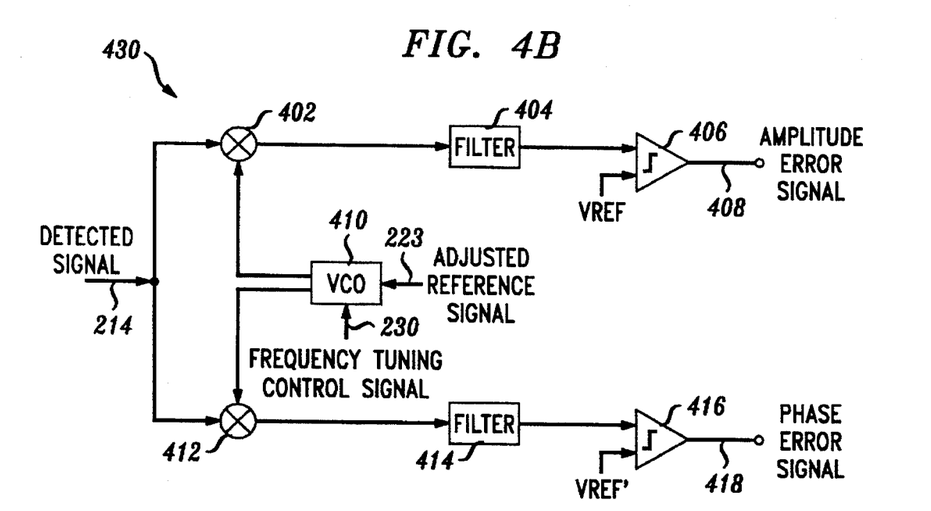
FIG. 4B is a block diagram of an amplitude/phase detector according to a preferred embodiment of the present invention.

FIG. 4B is a more detailed block diagram of the amplitude/phase detectors 430. Each amplitude/phase detector 430 includes a voltage controlled oscillator 410 which generates a signal having a frequency appropriate to cancel the harmonic in question. For example, the VCO 410 in the amplitude/phase detector 430A associated with the second harmonic of the optical data signal 118 generates a signal having a frequency equal to the frequency of the second harmonic.

The VCO 410 is phase locked to the electrical data signal 110 (FIG. 1), such that the signal generated by the VCO 410 has the same phase as the electrical data signal 110. Note that an external reference selector 224, which is a well known frequency divider (also called a prescaler), generates an adjusted reference signal 223 from a reference signal 222. This reference signal 222 has the same phase as the electrical data signal 110.

The signal generated by the VCO 410 includes a sine component and a cosine component. Generally, the detected signal 214 may be represented a sine wave.

The sine component of the signal produced by the VCO 410 is combined with the detected signal 214 in a well known mixer 402. The structure and operation of the mixer 402 will be apparent to persons skilled in the relevant art. The output of this mixer 402 is a DC voltage having a magnitude proportional to the magnitude of the harmonic in question. For example, the output of the mixer 402 in the amplitude/phase detector 430A associated with the second harmonic of the optical data signal 118 is a DC voltage having a magnitude substantially equal to the magnitude of the second harmonic.

The DC voltage output from the mixer 402 is applied to a well known filter 404 which operates in a well known manner to filter out any remaining AC components from the DC voltage. The filter 404 comprises a switched capacitor filter which operates to remove excess noise and spurious RF signals from the true error signal.

The filtered DC voltage output from the filter 404 is applied to a voltage comparator 406. The voltage comparator 406 operates in a well known manner to compare this filtered DC voltage to a reference voltage Vref. The voltage comparator 406, in a well known manner, outputs a voltage signal, called the amplitude error signal 408, having one of a discrete number of logic levels (preferably, between five to ten discrete logic levels are used) closest to the magnitude of the filtered DC voltage output from the filter 404. The comparator 406 functions as a well known slice amplifier and level comparator to provide discrete error signal levels of the appropriate voltage to allow the modulation controller 220 to function properly.

The cosine component of the signal produced by the VCO 410 is combined with the detected signal 214 in a well known mixer 412. The structure and operation of the mixer 412 will be apparent to persons skilled in the relevant art. The output of this mixer 412 is a DC voltage having a magnitude proportional to the phase of the harmonic distortion term in the optical signal 118. For example, the output of the mixer 412 in the amplitude/phase detector 430A associated with the second harmonic of the optical data signal 118 is a DC voltage having a magnitude proportional to the phase of the second harmonic.

The DC voltage output from the mixer 412 is applied to a well known filter 414 which operates in a well known manner to filter out any remaining AC components from the DC voltage. The filter 414 includes a switched capacitor low-pass filter which operates to remove excess noise and spurious RF signals from the true error signal.

The filtered DC voltage output from the filter 414 is applied to a voltage comparator 416. The voltage comparator 416 operates in a well known manner to compare this filtered DC voltage to a reference voltage Vref. The voltage comparator 416, in a well known manner, outputs a voltage signal, called the phase error signal 418, having one of a discrete number of logic levels (preferably, between five to ten discrete logic levels are used) closest to the magnitude of the filtered DC voltage output from the filter 414. The comparator 416 functions as a well known slice amplifier and level comparator to provide discrete error signal levels of the appropriate voltage to allow the modulation controller 220 to function properly.

3.2 Vector Modulation Controller

Referring again to FIG. 4A, the vector modulation controller 220 includes a control signal generator 432 for each harmonic of the optical data signal 118 that is being nulled. Thus, since preferably the second and the third harmonics are being nulled, the vector modulation controller 220 includes two control signal generators 432A, 432B. Each of the control signal generators 432 receives the amplitude error signal 408 and the phase error signal 418 from the corresponding amplitude/phase detector 430 in the error signal detector 216, and generates an amplitude control signal 256 and a phase control signal 252.

Figure 5:
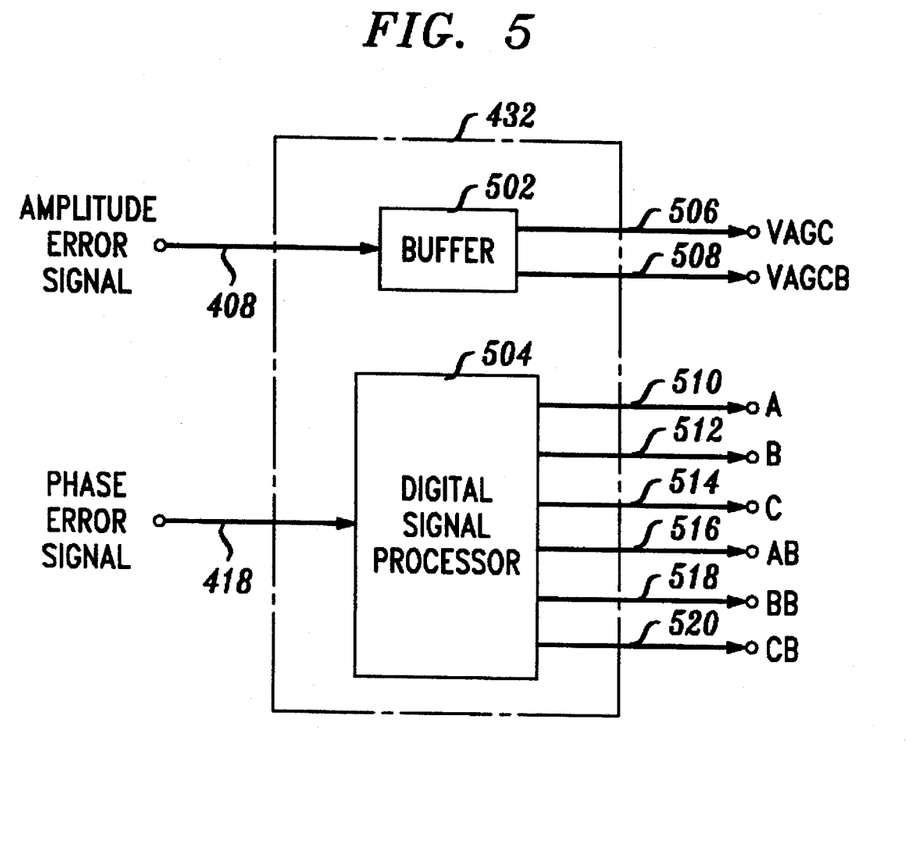
FIG. 5 is a block diagram of a control signal generator according to a preferred embodiment of the present invention.

FIG. 5 is a block diagram of the control signal generators 432. Each control signal generator 432 includes a buffer 502 which receives the respective amplitude error signal 408. The buffer 502 is a well known sample and hold amplifier, and operates to store the voltage that is present at its input (i.e., the amplitude error signal 408).

The stored amplitude error signal 408 is output from the buffer 502 as a VAGC signal 506 (VAGC stands for voltage amplifier gain control). The buffer 502 also outputs a VAGCB signal 508 (the "B" stands for "bar", i.e., "inverse"), which is identical to the VAGC signal 506 except that it has opposite phase (i.e., the VAGC signal 506 and the VAGCB signal 508 are 180 degrees out of phase). The manner in which the VAGCB signal 508 may be generated from the VAGC signal 506 will be apparent to persons skilled in the relevant art. The VAGC signal 506 and the VAGCB signal 508 collectively represent the amplitude control signal 256 or 258.

Each control signal generator 432 also includes a digital signal processor (DSP) 504 which receives the respective phase error signal 418. The DSP 504 analyzes the phase error signal 418 and determines the phase shift that is necessary to make the respective correction term 206 or 208 cancel the harmonic in question. For example, the DSP 504 in the control signal generator 432A associated with the second harmonic analyzes the phase error signal 418A and determines the phase shift that is necessary to make the second harmonic correction term 206 cancel the second harmonic of the optical data signal 118.

Figure 8:
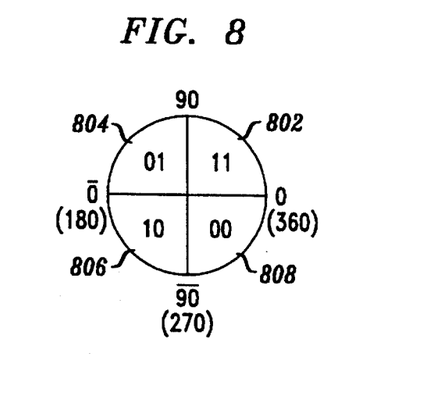
FIG. 8 is used to describe the manner in which the control signal generator of the present invention denotes require phase shifts.

The DSP 504 represents this phase shift by appropriately outputting an A voltage 510, a B digital value 512, and a C digital value 514. As graphically represented in FIG. 8, if the required phase shift is between 0 and 90 degrees, then the B digital value 512 is set to 1 and the C digital value 514 is set to 1. Similarly, if the required phase shift is between 90 and 180 degrees, 180 and 270 degrees, or 270 and 360 degrees, then the B and C digital values 512, 514 are set to "01", "10", or "00", respectively.

The A voltage 510 determines the exact phase shift within a range. For example, if the B and C digital values 512, 514 are set to "01" such that the phase shift is within the range from 90 to 180 degrees, the A voltage 510 indicates the exact phase shift within the range (whether the phase shift is 91 degrees, 92 degrees, etc.).

Preferably, the DSP 504 operates as follows to generate the A voltage 510, the B digital value 512, and the C digital value 514. The DSP 504 operates as a programmable digital logic element which provides the control signals to operate the phase shifter elements within the integrated circuit (IC). The DSP 504 functions as an 4-bit magnitude comparator with an input buffer amplifier and a digital and carry output. The magnitude of the phase error signal 418 at the appropriate frequency is buffered to adjust the input voltage range to a necessary level for the magnitude comparator to operate correctly. The comparator then generates a successive approximation of the magnitude of the input phase error signal 418 and enables a digital latch buffer connected to lines 512, 514, 518, and 520. The latched output from the comparator provides a digital output control in lines 512, 514, 518, and 520. The magnitude of the carry output is again buffered to provide an appropriate voltage level control signal on lines 510 and 516. The DSP 504 contains monitor taps so that the voltage value of all control lines can be monitored and the DSP 504 can also be reset by applying an external strobe input to the DSP 504.

Note that the DSP 504 also outputs AB, BB, and CB signals 516, 518, 520, which are identical to but opposite in phase to the A, B, and C signals 510, 512, 514, respectively. The manner in which the AB, BB, and CB signals 516, 518, 520 may be generated from the A, B, and C signals 510, 512, 514 will be apparent to persons skilled in the relevant art. The A, B, and C signals 510, 512, 514 and the AB, BB, and CB signals 516, 518, 520 collectively represent the phase control signal 252 or 254.

3.3 Phase Modulators

Figure 6:
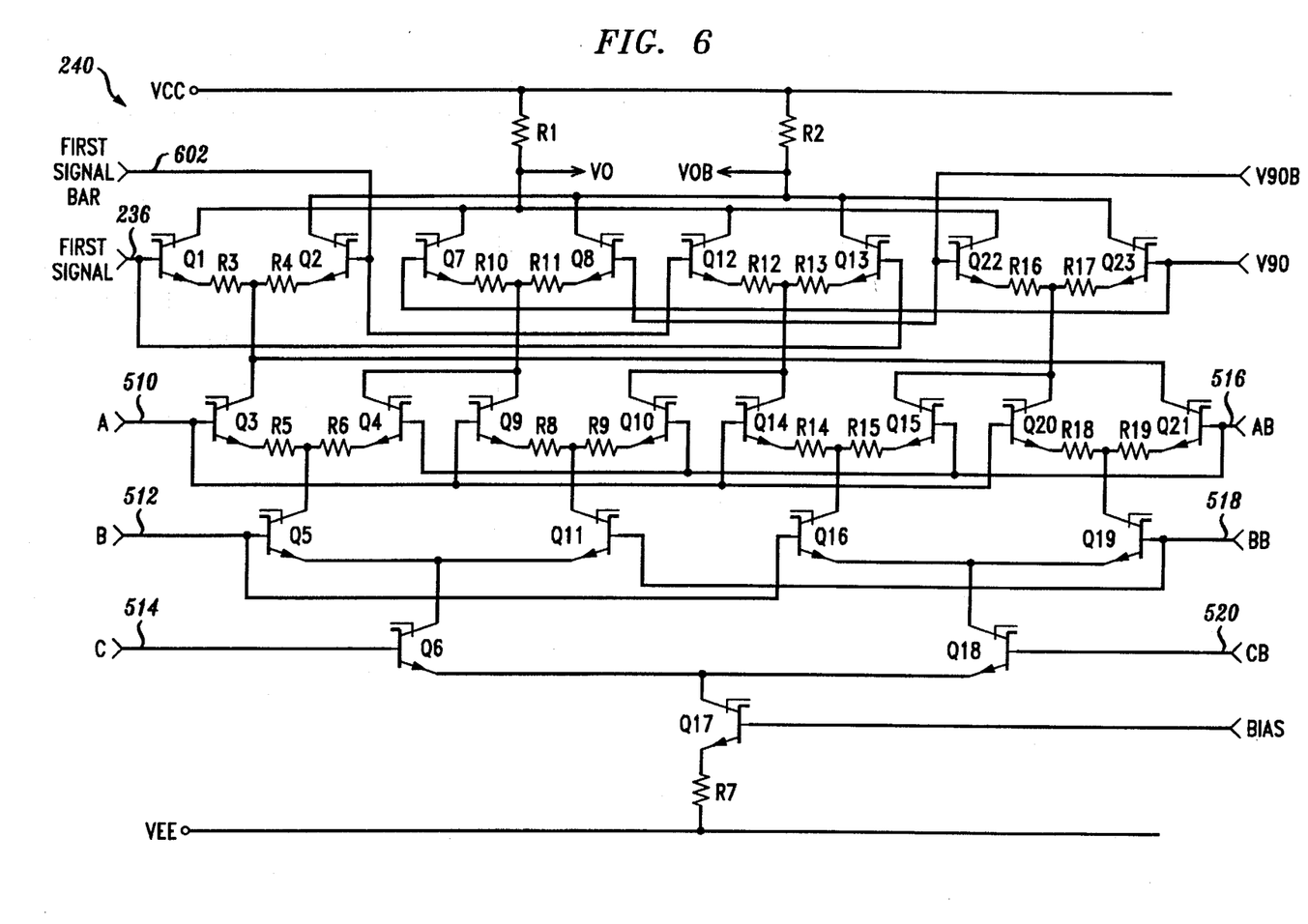
FIGS. 6 and 7 are circuit diagrams of a phase modulator and an amplitude modulator, respectively, according to a preferred embodiment of the present invention.

FIG. 6 is a circuit diagram of the first RF phase modulator 240 according to a preferred embodiment of the present invention. The structure and operation of the second RF phase modulator 242 is identical to that of the first RF phase modulator 240. Therefore, the circuit diagram shown in FIG. 6, as well as the following discussion, apply equally well to the second RF phase modulator 242.

The A, B, and C signals 510, 512, 514 and the AB, BB, and CB signals 516, 518, 520 generated by the DSP 504 in the control signal generator 432A in the vector modulation controller 220 are applied to the bases of transistors Q3, Q5, Q6, Q21, Q19, and Q18, respectively. The first signal 236 generated by the first VCO 232 is applied to the base of transistor Q1. A first signal bar 602, which is identical to the first signal 236 except opposite in phase (180 degree phase difference), is applied to the base of transistor Q2. The manner in which the first signal bar 602 may be generated from the first signal 236 will be apparent to persons skilled in the relevant art.

The first signal 236 and the first signal bar 602 represent the first balanced signal generated by the first VCO 232. The second balanced signal generated by the first VCO 232, which is equal in magnitude but 90 degrees out of phase with the first balanced signal, is represented by a V90 signal and a V90B signal. The V90 signal is applied to the base of transistor Q23 and the V90B signal is applied to the base of transistor Q22.

The first RF phase modulator 240 operates to shift the phase of the first signal 236 by an amount designated by the A, B, and C signals 510, 512, and 514. For example, as discussed above, if the B and C digital values 512, 514 are equal to "01", then the phase of the first signal 236 is shifted from 90 to 180 degrees. The A voltage 510 indicates the exact phase shift within this range of 90 to 180 degrees.

The first RF modulator 240 generates a balanced output voltage signal VO/VOB, which represents the first signal 236 after its phase has been shifted as discussed above. The frequency of the balanced output voltage signal VO/VOB is equal to the frequency of the first signal 236. The signals VO and VOB are 180 degrees out of phase. The balanced output voltage signal VO/VOB is provided as the phase shifted first signal 244 to the first RF amplitude modulator 248 (in other words, the balanced output voltage signal VO/VOB and the phase shifted first signal 244 are the same). Specifically, the phase shifted first signal 704 is equal to VO and the phase shifted first signal (bar) 702 is equal to VOB (see FIG. 7).

The first RF phase modulator 240 operates to generate the output voltage signal VO as follows. The first RF phase modulator 240 provides a phase shift between 0 and 360 degrees. The actual phase shift is achieved by taking a linear combination of the basis vector signals which are equivalent to the first and second signals generated by the first VCO 232. The phase difference between the first and second balanced signals of VCO 232 equals 90 degrees. Therefore, the two balanced signals are orthogonal and by taking a linear combination of the two balanced vectors by adjusting the control signals 510, 512, 514, 516, 518, and 520, the phase at the output VO/VOB may be varied continuously over the full 360 degree cycle. Furthermore, if the first and second balanced signals of VCO 232 are of equal amplitude, then the output balanced signal VO/VOB will have constant amplitude over the full 360 degree phase space. The above also describes the operation of the second RF phase modulator 242. Further details pertaining to the first RF phase modulator 240 will be apparent to persons skilled in the relevant art based on the teachings contained herein.

3.4 Amplitude Modulators

Figure 7:
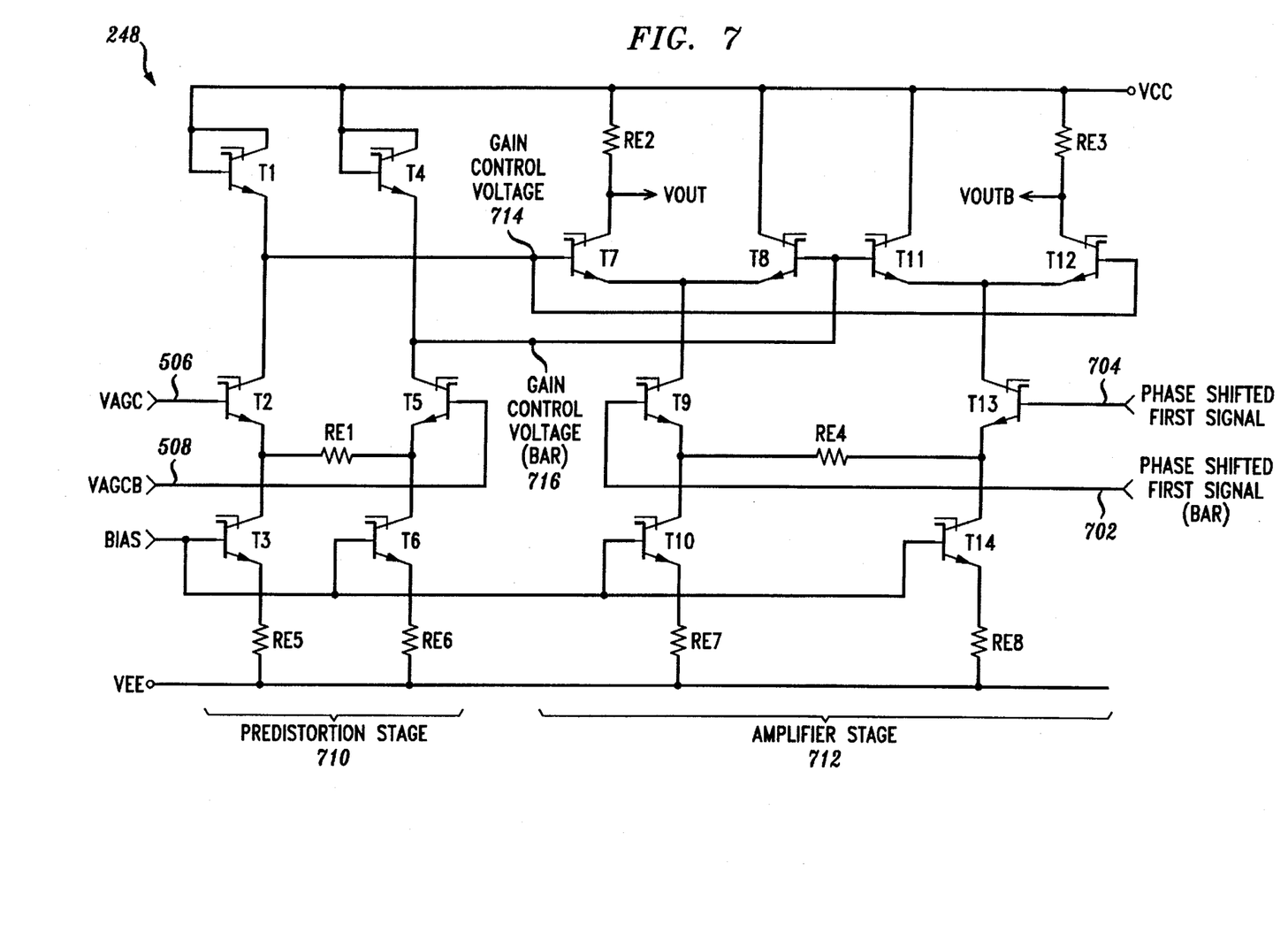

FIG. 7 is a circuit diagram of the first RF amplitude modulator 248 according to a preferred embodiment of the present invention. The structure and operation of the second RF amplitude modulator 250 is identical to that of the first RF amplitude modulator 248. Therefore, the circuit diagram shown in FIG. 7, as well as the following discussion, apply equally well to the second RF amplitude modulator 250.

The first RF amplitude modulator 248 includes a predistortion stage 710 and an amplifier stage 712. The VAGC signal 506 and the VAGCB signal 508 from the buffer 502 in the control signal generator 432A of the error signal detector 216 are applied to the bases of transistors T2 and T5, respectively, in the predistortion stage 710. The phase shifted first signal 244 and the phase shifted first signal (bar) 702 are applied to the bases of transistors T13 and T9, respectively, in the amplifier stage 712.

The predistortion stage 710 operates in a well known manner to enable linear control of the gain of the amplifier stage 712. In particular, the predistortion stage 710 operates to generate a gain control voltage 714 that is applied to the bases of transistors T7 and T12 and gain control voltage (bar) 716 that is applied to the bases of transistors T8 and T11. The manner in which this balanced gain control voltage 714/716 is generated is as follows. Voltages VAGC and VAGCB represent a balanced voltage VAGC'. This balanced voltage VAGC' is applied at the bases of transistors T2 and T5 which represent an emitter coupled pair. For most cases resistor RE1 is used to linearize the operation of T2 and T5.

This emitter coupled pair converts the voltage VAGC' into a differential current present at the collectors of T2 and T5. This current next generates a differential logarithmic voltage across transistors T1 and T4. This voltage is then applied to the bases of transistors T7, T8, and T12, T11 each representing emitter coupled pairs. As will be appreciated by persons skilled in the relevant art, when the logarithmic voltage is applied in this fashion to the bases of the emitter coupled pairs, the gain of the amplifier stage 712 is linearized with respect to VAGC'.

The amplifier stage 712 operates to amplify the phase shifted first signal 244 to thereby generate an output voltage signal Vout that has an amplitude appropriate to cancel the second harmonic of signal 118. The output voltage signal Vout has the appropriate frequency as the second harmonic, and is of appropriate phase to cancel the second harmonic of signal 118. The output voltage signal Vout represents the second harmonic correction term 206 (FIG. 2), which is used to produce the electrical modulating signal 114.

The amplifier stage 712 functions as a variable gain stage where the voltage gain depends on the VAGC' voltage. If the VAGC' voltage (506–508) is increased, more current flows in the collectors of transistors T8 and T11 as compared to transistors T7 and T12. This causes the amplifier gain to decrease since now more of the current of collectors T9 and T13 is steered to transistors T8 and T11 (away from loads RE2 and RE3) which are loaded by a short to VCC. Transistors T7 and T8, T11 and T12 are used as a steering switch to direct current toward and away from RE2 and RE3, thereby adjusting the voltage gain of the amplifier stage 712. The above also applies to the second RF amplitude modulator 250.

As will be apparent to persons skilled in the relevant art, the gain of the amplifier stage 712 ranges from 0 (if the magnitude of VAGC 506 is high) to 2*RE2*(amplitude of the phase shifted first signal 244)/RE4 (if the magnitude of VAGC 506 is low). Preferably, RE2 and RE3 are each equal to 100 ohms and RE4 is equal to 25 ohms. However, these values are implementation dependent.

It should be understood that the RF amplitude modulator 248 can be cascaded with other amplitude modulators if necessary to achieve the desired amplification/attenuation. The manner in which the laser interface 112 can be modified to include cascaded RF amplitude modulators will be apparent to persons skilled in the art based on the discussion contained herein.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of generating an electrical modulating signal for use by a laser to modulate an optical data signal, said laser having a non-linear modulation response pattern such that said optical data signal comprises a primary data signal and a plurality of harmonic distortion products, said method comprising the steps of:

(1) generating a correction electrical signal having a frequency equal to a frequency of one of said harmonic distortion products;

(2) detecting the phase and amplitude of one of said harmonic distortion products;

(3) phase shifting said correction electrical signal in accordance with said detected phase such that said correction electrical signal and said one of said harmonic distortion products are conjugately matched;

(4) amplifying said phase shifted correction electrical signal in accordance with said detected amplitude such that said phase shifted correction electrical signal and said one of said harmonic distortion products are equal in amplitude; and (5) combining said amplified and phase shifted correction electrical signal with an electrical data signal to form said electrical modulating signal.

2. The method of claim 1, wherein said one of said harmonic distortion products is a second harmonic distortion product of said optical data signal.

3. The method of claim 1, wherein step (2) comprises the steps of:

converting said optical data signal to a first electrical signal, said first electrical signal being an electrical representation of said optical data signal;

generating a second electrical signal having a frequency equal to said one of said harmonic distortion products; and mixing said first electrical signal with said second electrical signal to produce a first voltage signal having a magnitude proportional to an amplitude difference between said one of said harmonic distortion products and said correction electrical signal, and a second voltage signal having a magnitude proportional to a phase difference between said one of said harmonic distortion products and said correction electrical signal.

4. The method of claim 3, further comprising the following steps which are performed between steps (2) and (3):

generating an amplitude control signal from said first voltage signal, said amplitude control signal indicating amplification of said correction electrical signal required to establish an amplitude of said correction electrical signal equal to an amplitude of said one of said harmonic distortion products; and generating a phase control signal from said second voltage signal, said phase control signal indicating phase shifting of said correction electrical signal required to conjugately match said correction electrical signal and said one of said harmonic distortion products.

5. The method of claim 4, wherein step (3) comprises the step of:

phase shifting said correction electrical signal in accordance with said phase control signal.

6. The method of claim 4, wherein step (4) comprises the step of:

amplifying said phase shifted correction electrical signal in accordance with said amplitude control signal.

7. An adaptive equalizer for generating an electrical modulating signal for use by a laser to modulate an optical data signal, said laser having a nonlinear modulation response pattern such that said optical data signal comprises a primary data signal and a plurality of harmonic distortion products, comprising:

a voltage controlled oscillator to generate a correction electrical signal having a frequency equal to a frequency of one of said harmonic distortion products;

an error signal detector to detect the phase and amplitude of one of said harmonic distortion products;

a phase modulator to phase shift said correction electrical signal in accordance with said detected phase such that said correction electrical signal and said one of said harmonic distortion products are conjugately matched;

an amplitude modulator to amplify said phase shifted correction electrical signal in accordance with said detected amplitude such that said phase shifted correction electrical signal and said one of said harmonic distortion products are equal in amplitude; and means for combining said amplified and phase shifted correction electrical signal with an electrical data signal to form said electrical modulating signal.

8. The adaptive equalizer of claim 7, wherein said one of said harmonic distortion products is a second harmonic distortion product of said optical data signal.

9. The adaptive equalizer of claim 7 in which said laser comprises an optical detector to convert said optical data signal to a first electrical signal, said first electrical signal being an electrical representation of said optical data signal, and wherein said error signal detector comprises:

a second voltage controlled oscillator to generate a second electrical signal having a frequency equal to said one of said harmonic distortion products; and a mixer to mix said first electrical signal with said second electrical signal to produce a first voltage signal having a magnitude proportional to an amplitude difference between said one of said harmonic distortion products and said correction electrical signal, and a second voltage signal having a magnitude proportional to a phase difference between said one of said harmonic distortion products and said correction electrical signal.

10. The adaptive equalizer of claim 9, further comprising:

a vector modulation controller to generate an amplitude control signal from said first voltage signal, said amplitude control signal indicating amplification of said correction electrical signal required to establish an amplitude of said correction electrical signal equal to an amplitude of said one of said harmonic distortion products, and to generate a phase control signal from said second voltage signal, said phase control signal indicating phase shifting of said correction electrical signal required to conjugately match said correction electrical signal and said one of said harmonic distortion products.

11. The adaptive equalizer of claim 10, wherein said phase modulator comprises:

means for phase shifting said correction electrical signal in accordance with said phase control signal.

12. The adaptive equalizer of claim 10, wherein said amplitude modulator comprises:

means for amplifying said phase shifted correction electrical signal in accordance with said amplitude control signal.

* * * * *